June 20, 1933.   G. F. GERKEN   1,915,224
WHEEL MOUNTING AND STEERING GEAR
Filed Nov. 1, 1932   2 Sheets-Sheet 1
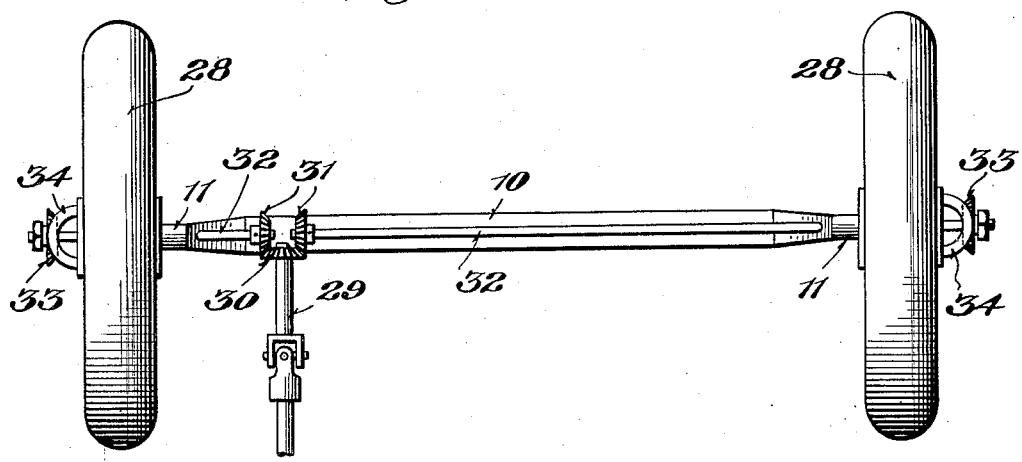
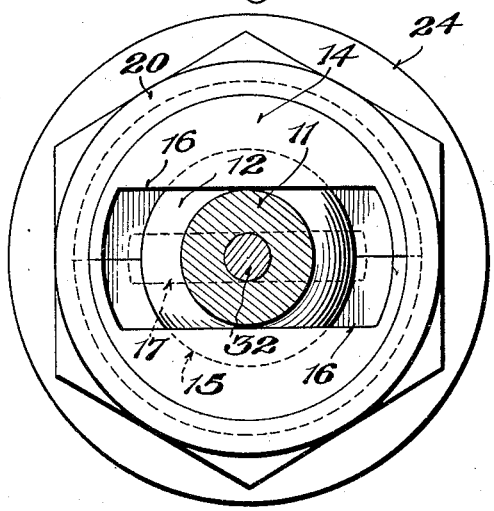
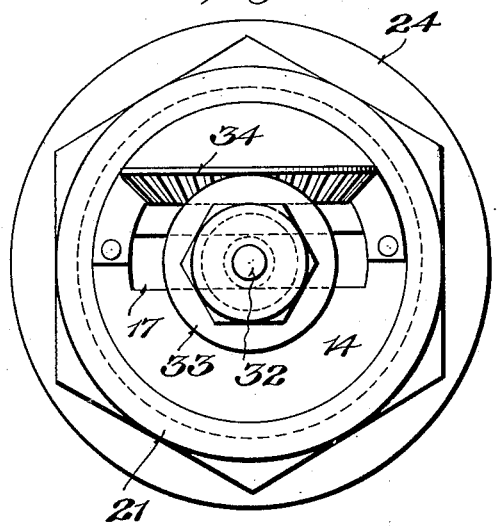
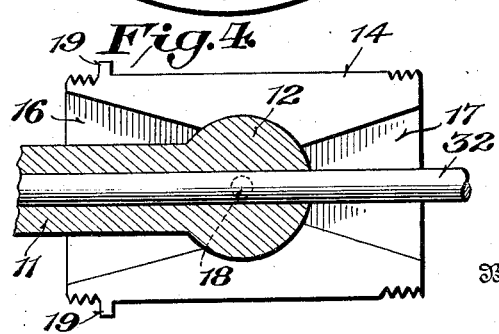
Inventor
Gilbert F. Gerken,
By Royal E. Burnham,
Attorney

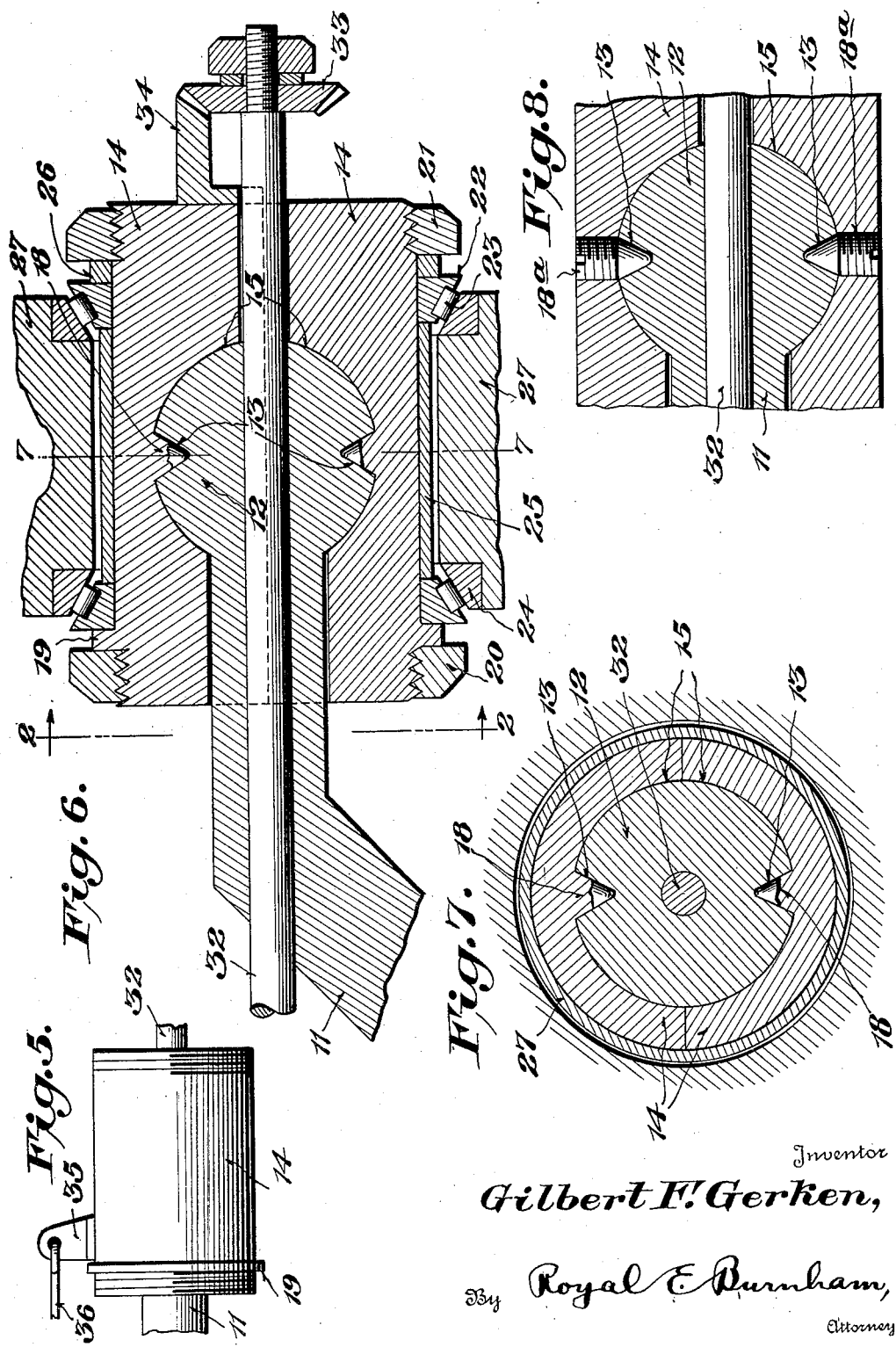

Patented June 20, 1933

1,915,224

UNITED STATES PATENT OFFICE

GILBERT F. GERKEN, OF FAIRMONT, WEST VIRGINIA

WHEEL MOUNTING AND STEERING GEAR

Application filed November 1, 1932. Serial No. 640,704.

The invention relates to the mounting of wheels on the front axle of a vehicle, and also to steering-gear for those wheels.

The front axles, in accordance with the invention, have integral end spindles, and wheels are mounted thereon in such manner that they may be turned simultaneously on substantially vertical axes for steering purposes.

By such mounting there are avoided the weaknesses that are inherent and the wear that occurs in the conventional journaling of front wheels on spindles swingable on knuckles in forks at the ends of the axle proper, the liability of the wheels to shimmy is avoided or reduced materially, and in general a strong and comparatively simple construction and assembly of parts afforded from which other advantages accrue.

Further, the invention provides simple and effective mechanism for maintaining the front wheels in substantially parallel relation to each other and for their steering control.

When considered with the description herein, the characteristics of the invention are apparent from the accompanying drawings, forming part hereof, where an embodiment of the invention in a motor-vehicle is disclosed, for purposes of illustration.

Like reference-characters refer to corresponding parts in the views of the drawings, of which—

Fig. 1 is a plan view of the front axle, wheels, and associated parts of a motor-vehicle;

Fig. 2 is an end view of the boxing as seen when looking in direction of the arrows, Fig. 6;

Fig. 3 is a view of the opposite or outer end of the boxing;

Fig. 4 is a plan view of one of the boxing sections;

Fig. 5 is a plan illustrative of an alternative form of steering connection to the boxing;

Fig. 6 is a vertical longitudinal section;

Fig. 7 is a section on the line 7—7, Fig. 6;

Fig. 8 is a section illustrative of another form of pivots.

The front axle 10 of the vehicle with which the invention is associated has at each end a substantially horizontal integral portion 11 in place of the usual knuckle-mounted swingable spindles, the portions 11 being in a plane above the usual underslung median portion of the axle. Each of these end portions is formed integrally with a ball or substantially spherical terminal enlargement 12, in which there are vertically-aligned diametrically opposite seats or depressions 13.

A non-rotatable substantially cylindrical boxing 14 is mounted on each axle end. It contains a spherical cavity 15 having its wall fitting closely to the ball 12. An opening 16 extends from one side of the ball to the inner end of the boxing for accommodation of the embraced axle portion, and an opening 17 extends from the other side of the ball to the outer end of the boxing for a purpose hereinafter explained.

The boxing is held against rotation on the axle, and permitted to turn on a substantially vertical axis, by pivots of the boxing extending into and fitting closely the seats 13 of the ball. These pivots may be formed integrally of the boxing material as shown at 18 in Figs. 6 and 7, or they may be the inner ends of screws 18a as shown in Fig. 8.

The upper and lower walls of the opening 16 fit closely against the upper and lower sides of the axle adjacent to the ball, and thus they prevent tipping or lateral deflection from the normal of the boxing and the wheel thereon, and prevent tipping effort being imposed on the pivots. The side walls of the opening widen or diverge from the cavity to the end of the boxing, in order to permit the boxing to swing on its pivots. The ball, which fits closely in the cavity, takes all efforts and thrusts in axial direction, with the result that they are not imposed upon the pivots, which are left merely to perform the pivotal function and also to prevent rotation of the boxing.

The boxing has an annular abutment 19 near its inner end. The boxing is made of a plurality of sections, preferably two, in order that it may be placed over the ball on the axle end. The sections are held closely together by rings 20 and 21 screwed onto the ends of the boxing. Before the outer ring 21 is screwed onto the boxing, raceways 22 of bearing parts 23 and 24 and a spacing-sleeve 25 are slid axially to place on the boxing, together with an end washer 26, and then the ring 21 is turned home and the parts maintained tightly in place between the ring and the abutment 19.

The bearing parts carry a rotatable hub 27 of a wheel 28. The wheel and its bearings may be removed from the hub, in an obvious manner, after removal of the ring 21.

The two steerable wheels are maintained in substantially parallel relation to each other and are swung on their pivots for steering purposes by mechanism as shown by Figs. 1 and 6.

This mechanism includes an actuating-shaft 29 operatively associated with, and rotatable by, a steering wheel (not shown). The shaft has fast thereon a pinion 30 in mesh with gears 31 on adjacent ends of transverse shafts 32.

Each shaft 32 extends through an axle end beyond the outer side of the boxing, the shaft being accommodated by the opening 17, the side walls of which diverge or widen from the ball to the outer end so that the shaft will not interfere with the pivotal motion of the boxing.

A gear 33 fast on the outer end portion of each shaft 32 meshes with a segmental gear 34 fast on, and extending substantially horizontally from, the outer end of the boxing.

When the actuating-shaft 29 is rotated, the two shafts 32 are rotated in opposite directions, with the result that the two boxings and the wheels thereon are turned in the same direction for steering purposes.

The two boxings also may be turned on their pivots for steering purposes by means of gear that includes for each boxing an arm 35 extending laterally therefrom and to which is pivotally connected a rod 36, as shown by Fig. 5, the two rods 36 of the two boxings being parts of any suitable steering mechanism (not shown).

What I claim as new, and desire to secure by Letters Patent, is—

1. In a vehicle, an axle, a wheel-carrying boxing mounted to swing on said axle in a substantially vertical axis, a rotatable shaft in said axle extending beyond an end thereof, a pinion on the outer end of said shaft, a gear on said boxing in mesh with said pinion, and means to rotate said shaft.

2. In a vehicle, an axle, a wheel-carrying boxing mounted to swing on said axle on a substantially vertical axis and having an opening the upper and lower walls of which closely contact with said axle, a rotatable shaft in said axle extending beyond an end thereof, a pinion on the outer end of said shaft, a gear on said boxing in mesh with said pinion, and means to rotate said shaft.

3. In a vehicle, an axle, a spherical enlargement thereon, a wheel-carrying boxing having a spherical cavity in which said enlargement closely fits and having also an opening extending from said cavity to one end and the upper and lower walls of said opening closely contacting with said axle, pivots in a substantially vertical line affording an axis on which said boxing is swingable, a rotatable shaft in said axle extending beyond an end thereof, a pinion on the outer end of said shaft, a gear on said boxing in mesh with said pinion, and means to rotate said shaft.

4. In a vehicle, an axle, a wheel-carrying boxing mounted on each end portion of said axle to swing on a substantially vertical axis, rotatable shafts disposed longitudinally of said axle and each extending through an axle end portion beyond the boxing thereon, a pinion on the outer end of each of said shafts, a gear on each boxing in mesh with a shaft-pinion, adjacent gears on said shafts, an actuating-shaft, and a pinion on said actuating shaft in mesh with said last-mentioned gears.

Signed at Washington, D. C., November 1, 1932.

GILBERT F. GERKEN.